United States Patent
Lim et al.

(10) Patent No.: US 11,880,996 B2
(45) Date of Patent: Jan. 23, 2024

(54) APPARATUS FOR ACQUIRING SURROUNDING INFORMATION OF VEHICLE AND METHOD FOR CONTROLLING THEREOF

(71) Applicants: HYUNDAI MOTOR COMPANY, Seoul (KR); KIA MOTORS CORPORATION, Seoul (KR)

(72) Inventors: Jonghyuk Lim, Seoul (KR); Jong Hoon Kwak, Gunpo-si (KR); Heechul Choi, Seoul (KR); Jihee Han, Seoul (KR); Junsik An, Seoul (KR); Junhyung Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 381 days.

(21) Appl. No.: 17/209,443

(22) Filed: Mar. 23, 2021

(65) Prior Publication Data

US 2022/0076440 A1   Mar. 10, 2022

(30) Foreign Application Priority Data

Sep. 4, 2020   (KR) .................... 10-2020-0112902

(51) Int. Cl.
*G06K 9/00*  (2022.01)
*G06T 7/70*  (2017.01)
(Continued)

(52) U.S. Cl.
CPC ............. *G06T 7/70* (2017.01); *G05D 1/0246* (2013.01); *G06T 7/50* (2017.01); *G06T 7/55* (2017.01);
(Continued)

(58) Field of Classification Search
CPC ..... G06T 7/10; G06T 7/11; G06T 7/50; G06T 7/55; G06T 7/60; G06T 7/62; G06T 7/70; G06T 2207/10004; G06T 2207/10016; G06T 2207/10028; G06T 2207/30236; G06T 2207/30241; G06T 2207/30244; G06T 2207/30248; G06T 2207/30252; G06T 2207/30261; G06V 10/22; G06V 10/25; G06V 10/26; G06V 20/10; G06V 20/182; G06V 20/54; G06V 20/56;
(Continued)

(56) References Cited

U.S. PATENT DOCUMENTS 9,052,329 B2 * 6/2015 Fan .......................... G06T 7/50
10,586,456 B2 * 3/2020 Wang ................... G06V 20/588
(Continued)

*Primary Examiner* — Eric Rush
(74) *Attorney, Agent, or Firm* — Morgan, Lewis & Bockius LLP

(57) ABSTRACT

An apparatus for acquiring surrounding information of a vehicle includes: a camera configured to acquire an entire image of at least one surrounding vehicle; and a controller configured to derive at least one of coordinates of a wheel image area or coordinates of a front-rear image area included in an entire image area, and determine distance information from the vehicle to the at least one surrounding vehicle based on a relative positional relationship between the entire image area and the at least one of the wheel image area coordinates or the front-rear image area coordinates.

18 Claims, 16 Drawing Sheets

(51) Int. Cl.
    *G06T 7/55*     (2017.01)
    *G06V 10/22*     (2022.01)
    *G06V 20/56*     (2022.01)
    *G05D 1/02*     (2020.01)
    *G06T 7/50*     (2017.01)

(52) U.S. Cl.
    CPC .............. *G06V 10/22* (2022.01); *G06V 20/56* (2022.01); *G06T 2207/30236* (2013.01); *G06T 2207/30244* (2013.01); *G06T 2207/30252* (2013.01)

(58) Field of Classification Search
    CPC ...... G06V 20/58; B60W 40/02; B60W 40/04; B60W 2050/0001; B60W 60/001; B60W 60/0011; B60W 2420/42; G05D 1/021; G05D 1/0231; G05D 1/0246; G01B 11/14; G01B 11/22

USPC ....... 382/100, 103, 104, 106, 154, 173, 181, 382/195, 199, 209, 217, 224, 282, 285, 382/286, 288, 291; 348/118, 135, 140, 348/142, 143, 148, 149, 169; 701/1, 23, 701/26, 28, 117, 300–302
    See application file for complete search history.

(56) References Cited

U.S. PATENT DOCUMENTS

| | | | |
|---|---|---|---|
| 2015/0088378 A1* | 3/2015 | Sugai | B60W 40/06 701/37 |
| 2019/0019045 A1* | 1/2019 | Ogura | G06V 10/44 |
| 2020/0238991 A1* | 7/2020 | Aragon | G06V 10/446 |
| 2022/0092876 A1* | 3/2022 | Shokonji | G06V 20/58 |
| 2023/0085455 A1* | 3/2023 | Mori | G06V 20/588 382/104 |

* cited by examiner

APPARATUS FOR ACQUIRING SURROUNDING INFORMATION OF VEHICLE AND METHOD FOR CONTROLLING THEREOF

CROSS-REFERENCE TO RELATED APPLICATION(S)

The present application claims the benefit of priority to Korean Patent Application No 10-2020-0112902, filed on Sep. 4, 2020 in the Korean Intellectual Property Office, the entire contents of which is incorporated herein for all purposes by this reference.

TECHNICAL FIELD

The present disclosure relates to a vehicle and a controlling method thereof acquiring information on a surrounding vehicle through image recognition.

BACKGROUND

The vehicle's autonomous driving technology is a technology for automatically driving a vehicle by grasping a condition of the road without a driver controlling a brake, a steering wheel, or an accelerator pedal.

Autonomous driving technology is a core technology for smart car implementation which includes technology such as Highway driving assistance system (HDA, technology that automatically maintains the distance between cars), Rear side alarm system (BSD, technology to detect nearby vehicles while reversing and sound an alarm), Automatic emergency braking system (AEB, a technology that activates the brake system when the vehicle ahead is not recognized), Lane departure warning system (LDWS), Lane keeping assistance system (LKAS, a technology that compensates for leaving the lane without turn signals), Advanced Smart Cruise Control (ASCC, technology that maintains the distance between cars at a set speed and travels at a constant speed), Congested Section Driving Assistance System (TJA), Parking Collision-Avoidance Assist (PCA), and an autonomous parking system (Remote Smart Parking Assist).

However, research on an efficient and accurate calculation method for analyzing the location of surrounding vehicles through the recognized image is actively being conducted.

BRIEF SUMMARY

The present disclosure provides a vehicle and a controlling method thereof capable of efficiently and accurately calculating the distance and direction of the vehicle and surrounding vehicles by using the positional relationship between the entire image of the surrounding vehicle, the wheel image, and the front-rear images.

In accordance with an aspect of the present disclosure, an apparatus for acquiring surrounding information of a vehicle includes: a camera configured to acquire an entire image of at least one surrounding vehicle; and a controller configured to derive at least one of coordinates of a wheel image area or coordinates of a front-rear image area included in an entire image area, and determine distance information from the vehicle to the surrounding vehicle based on a relative positional relationship between the entire image area, and the at least one of the wheel image area coordinates or the front-rear image area coordinates.

The controller may be configured to group the at least one of the wheel image area or the front-rear image area included in the entire image area into an image corresponding to the surrounding vehicle.

The controller may be configured to determine as erroneously detected when the center coordinates of at least two image areas of the wheel image area or the front-rear image area are included in one of the wheel image area or the front-rear image area.

The controller may be configured to acquire a plurality of the wheel images and the front-rear images and determine that it has been erroneously detected when the front-rear image area is provided between the plurality of wheel image area coordinates.

The controller may be configured to acquire a plurality of the wheel images and the front-rear images, and determine whether or not erroneous detection by comparing the coordinate information of the plurality of wheel images.

The controller may be configured to determine distance information from the vehicle to the surrounding vehicle based on the intersection between the lower center point extension line of each of the plurality of wheel image areas and the vertical extension lines of the front-rear image area close to the plurality of wheel image areas when a plurality of the wheel images are detected.

The controller may be configured to determine a first distance corresponding to the height coordinate of the camera, and a second distance of the wheel image area, determine the height coordinates of the wheel image area based on the ratio of the first distance and the second distance, generate a vertical extension line of the front-rear image area based on the height coordinates of the wheel image area, and determine distance information from the vehicle to the surrounding vehicle based on the intersection of the vertical line and the ground.

The controller may be configured to determine distance information from the vehicle to the surrounding vehicle based on the intersection of the vertical extension line of the front-rear image area close to the center line of the entire image area and the ground when only the entire image and the front-rear image are detected.

The controller may be configured to determine distance information from the vehicle to the surrounding vehicle based on the intersection of the extension line of the lower center point of the plurality of wheel image areas and the lower line of the entire image area when only the entire image and the plurality of wheel images are detected.

The controller may be configured to determine distance information from the vehicle to the surrounding vehicle based on the intersection of the extension line of the center line of one wheel image area and the lower line of the entire image area when only the entire image and one of wheel images are detected.

The controller may be configured to determine the direction of the surrounding vehicle based on the vehicle, based on the detection type determined based on the whole image, the wheel image, and the front-rear image.

In accordance with another aspect of the present disclosure, a controlling method for acquiring surrounding information of a vehicle includes: acquiring an entire image of at least one surrounding vehicle; deriving at least one of coordinates of a wheel image area or coordinates of a front-rear image area included in an entire image area, and determining distance information from the vehicle to the surrounding vehicle based on a relative positional relationship between the entire image area, and the at least one of the wheel image area coordinates or the front-rear image area coordinates.

The method may further comprise: grouping the at least one of the wheel image area or the front-rear image area included in the entire image area into an image corresponding to the surrounding vehicle.

The method may further comprise: determining as erroneously detected when the center coordinates of at least two image areas of the wheel image area or the front-rear image area are included in one of the wheel image area or the front-rear image area.

The method may further comprise: acquiring a plurality of the wheel images and the front-rear images and determining that it has been erroneously detected when the front-rear image area is provided between the plurality of wheel image area coordinates.

The method may further comprise: acquiring a plurality of the wheel images and the front-rear images, and determining whether or not erroneous detection by comparing the coordinate information of the plurality of wheel images.

The determining distance information from the vehicle to the surrounding vehicle may include: determining distance information from the vehicle to the surrounding vehicle based on the intersection between the lower center point extension line of each of the plurality of wheel image areas and the vertical extension lines of the front-rear image area close to the plurality of wheel image areas when a plurality of the wheel images are detected.

The determining distance information from the vehicle to the surrounding vehicle may include: determining a first distance corresponding to the height coordinate of the camera, and a second distance of the wheel image area, determining the height coordinates of the wheel image area based on the ratio of the first distance and the second distance, generating a vertical extension line of the front-rear image area based on the height coordinates of the wheel image area, and determining distance information from the vehicle to the surrounding vehicle based on the intersection of the vertical line and the ground.

The determining distance information from the vehicle to the surrounding vehicle may include: determining distance information from the vehicle to the surrounding vehicle based on the intersection of the vertical extension line of the front-rear image area close to the center line of the entire image area and the ground when only the entire image and the front-rear image are detected.

The determining distance information from the vehicle to the surrounding vehicle may include: determining distance information from the vehicle to the surrounding vehicle based on the intersection of the extension line of the lower center point of the plurality of wheel image areas and the lower line of the entire image area when only the entire image and the plurality of wheel images are detected.

DETAILED DESCRIPTION

Figure 1:
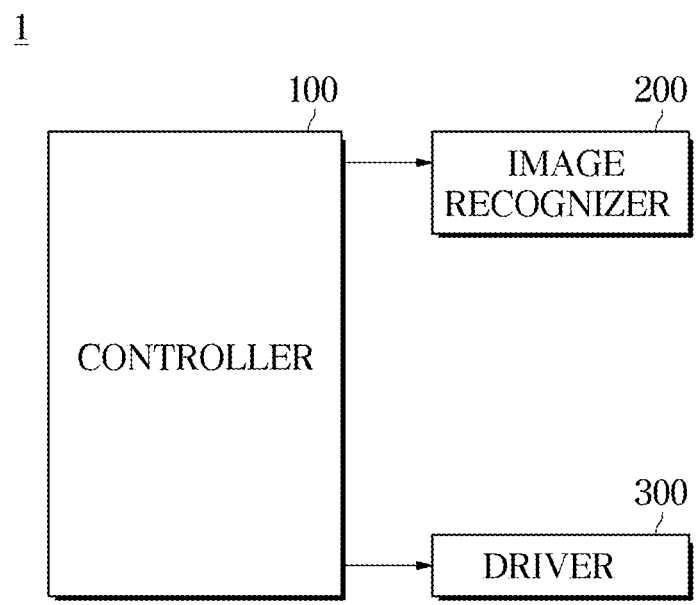
FIG. 1 is a control block diagram according to an embodiment.

In the following description, like reference numerals refer to like elements throughout the specification. This specification does not describe all elements of the embodiments, and in the Field of the Disclosure to which an exemplary embodiment of the present disclosure pertains, there is no overlap between the general contents or the embodiments. Terms such as "unit", "module", "member", and "block" may be embodied as hardware or software. According to embodiments, a plurality of "unit", "module", "member", and "block" may be implemented as a single component or a single "unit", "module", "member", and "block" may include a plurality of components.

It will be understood that when an element is referred to as being "connected" another element, it may be directly or indirectly connected to the other element, wherein the indirect connection includes "connection via a wireless communication network".

Further, when a part "includes" or "comprises" an element, unless there is a particular description contrary thereto, the part may further include other elements, not excluding the other elements.

Throughout the specification, when a member is said to be positioned "on" another member, this includes not only the case where the member is in contact with the other member, but also the case where another member exists between the two members.

Terms such as first and second are used to distinguish one component from other components, and the component is not limited by the above-described terms.

Expressions in the singular number include expressions in the plural unless the context clearly has exceptions.

In each step, the identification code is used for convenience of explanation, and the identification code does not describe the order of each step, and each step may be performed differently from the specified order unless a specific sequence is clearly stated in the context.

Hereinafter, an operating principle and embodiments of the present disclosure will be described with reference to the accompanying drawings.

FIG. 1 is a control block diagram according to an embodiment.

Referring to FIG. 1, a vehicle 1 according to an exemplary embodiment may include a image recognizer 200, a controller 100, and a driver 300.

The image recognizer 200 may be provided as a camera.

The camera may have a plurality of channels and acquire an image around the vehicle.

The camera according to an embodiment may be provided around a vehicle to perform an operation of a surround view monitor (SVM).

The camera may include a charge-coupled device (CCD) camera 100 or a CMOS color image sensor installed in the vehicle 1. Here, both CCD and CMOS refer to sensors that convert light that has entered through the lens of the camera 100 into electrical signals and store them.

The camera may acquire an entire image of at least one surrounding vehicle provided around the vehicle.

The entire image may refer to an image including all components of surrounding vehicles.

In addition, the vehicle may acquire a front-rear image of the surrounding vehicle.

The controller 100 may derive at least one of coordinates of a wheel image area and coordinates of a front-rear image area included in the entire image area.

That is, the vehicle wheel or front-rear image may be included in the entire vehicle image.

The wheel image refers to the wheel of the vehicle.

The front-rear image refers to a front part or a rear part of a vehicle, and may refer to an image excluding a side part of the vehicle.

Meanwhile, the controller can derive coordinate information by acquiring each image and converting each image into information of a coordinate system.

The controller may determine distance information from the vehicle to the surrounding vehicle based on a relative positional relationship between the entire image area and at least one of the wheel image area coordinates or the front-rear image area coordinates.

The controller may group at least one of a wheel image area or a front-rear image area included in the entire image area into an image corresponding to the surrounding vehicle.

In other words, the controller can recognize the wheel image and the front or rear image included in the entire image by matching it with the surrounding vehicle.

If the center coordinates of at least two image areas of the wheel image area or the front-rear image area are included in one of the wheel image area or the front-rear image area, the controller may determine that it is erroneously detected.

The erroneous detection is an operation in which the controller determines that the image has been erroneously recognized. If it is determined that the image has been erroneously detected, the controller may exclude the image from the operation.

The controller acquires a plurality of wheel images of the surrounding vehicles and front-rear images of the surrounding vehicles, and when the front-rear image area of the surrounding vehicle is provided between the plurality of wheel image area coordinates of the surrounding vehicle, the controller may determine that it is erroneously detected.

The controller acquires a plurality of wheel images of the surrounding vehicles and front-rear images of the surrounding vehicles, and compares coordinate information of a wheel image area of a plurality of the surrounding vehicles to determine whether to detect an error.

When a plurality of wheel images of the surrounding vehicles are detected, based on the intersection of the lower central point extension line of each of the wheel image area areas of the plurality of surrounding vehicles and the vertical extension line of the front-rear image area of the surrounding vehicle close to the wheel image area of the plurality of surrounding vehicles, the controller may determine distance information from the vehicle to the surrounding vehicle.

The controller may determine the intersection of the extension line as the nearest point of the vehicle and the surrounding vehicle and determine the distance between the vehicle and the surrounding vehicle based on the nearest point.

When a wheel image area of one of the surrounding vehicles is detected, the controller may determine a first distance corresponding to the height coordinate of the camera and a second distance of the wheel image area of the surrounding vehicle.

The first distance may be formed as an intersection of the ground and an extension line connecting the height coordinate of the camera and the height coordinate of the wheel image area.

The controller may determine the height coordinate of the wheel image area of the surrounding vehicle based on the ratio of the first distance and the second distance.

The controller generates a vertical extension line of the front-rear image area of the surrounding vehicle based on the height coordinates of the wheel image area of the surrounding vehicle, and determines distance information from the vehicle to the surrounding vehicle based on the intersection of the vertical extension line and the ground.

When only the entire image of the surrounding vehicle and the front-rear image of the surrounding vehicle are detected, the controller may determine distance information from the vehicle to the surrounding vehicle based on the intersection of the ground and the vertical extension line of the front-rear image area of the surrounding vehicle close to the center line of the entire image area of the surrounding vehicle.

When only the entire image of the surrounding vehicle and the wheel images of the plurality of surrounding vehicles are detected, based on the intersection of the extension line of the lower center point of the wheel image area of the plurality of surrounding vehicles and the lower line of the entire image area of the surrounding vehicle, the controller may determine distance information from the vehicle to the surrounding vehicle.

When only the entire image of the surrounding vehicle and the wheel image of one of the surrounding vehicles are detected, the controller may determine distance information from the vehicle to the surrounding vehicle based on an intersection of an extension line of a center line of a wheel image area of one surrounding vehicle and a lower line of the entire image area of the surrounding vehicle.

Based on the entire image of the surrounding vehicle, the wheel image of the surrounding vehicle, and the front-rear image of the surrounding vehicle, the controller may determine the direction of the surrounding vehicle based on the vehicle by using the determined detection type.

Specifically, the controller can classify surrounding vehicles into multiple types. In addition, directions corresponding to a plurality of types may be stored in advance, and if it is determined that the surrounding vehicle corresponds to the corresponding type, a direction corresponding to the type may be determined as the direction of the surrounding vehicle.

The controller may be implemented by a memory (not shown) that stores data on an algorithm for controlling the operation of components in a vehicle or a program that reproduces the algorithm, and a processor (not shown) that performs the above-described operation using data stored in the memory. In this case, the memory and the processor may be implemented as separate chips, respectively. Alternatively, the memory and the processor may be implemented as a single chip.

In addition, the vehicle may include a driver 300.

The driver may be provided as a device capable of driving a vehicle.

According to an embodiment, the driver may include an engine and may include various components for driving the engine.

Specifically, the driver may include a brake and a steering device, and there is no limitation on the device configuration as long as it is a configuration that implements driving of the vehicle.

The controller may drive the vehicle by controlling the driver based on the derived distance information of the vehicle and surrounding vehicles.

At least one component may be added or deleted corresponding to the performance of the components of the vehicle shown in FIG. 1. In addition, it will be readily understood by those of ordinary skill in the art that the mutual positions of the components may be changed corresponding to the performance or structure of the system.

Each component shown in FIG. 1 refers to software and/or hardware components such as a Field Programmable Gate Array (FPGA) and an Application Specific Integrated Circuit (ASIC).

Figure 2A:
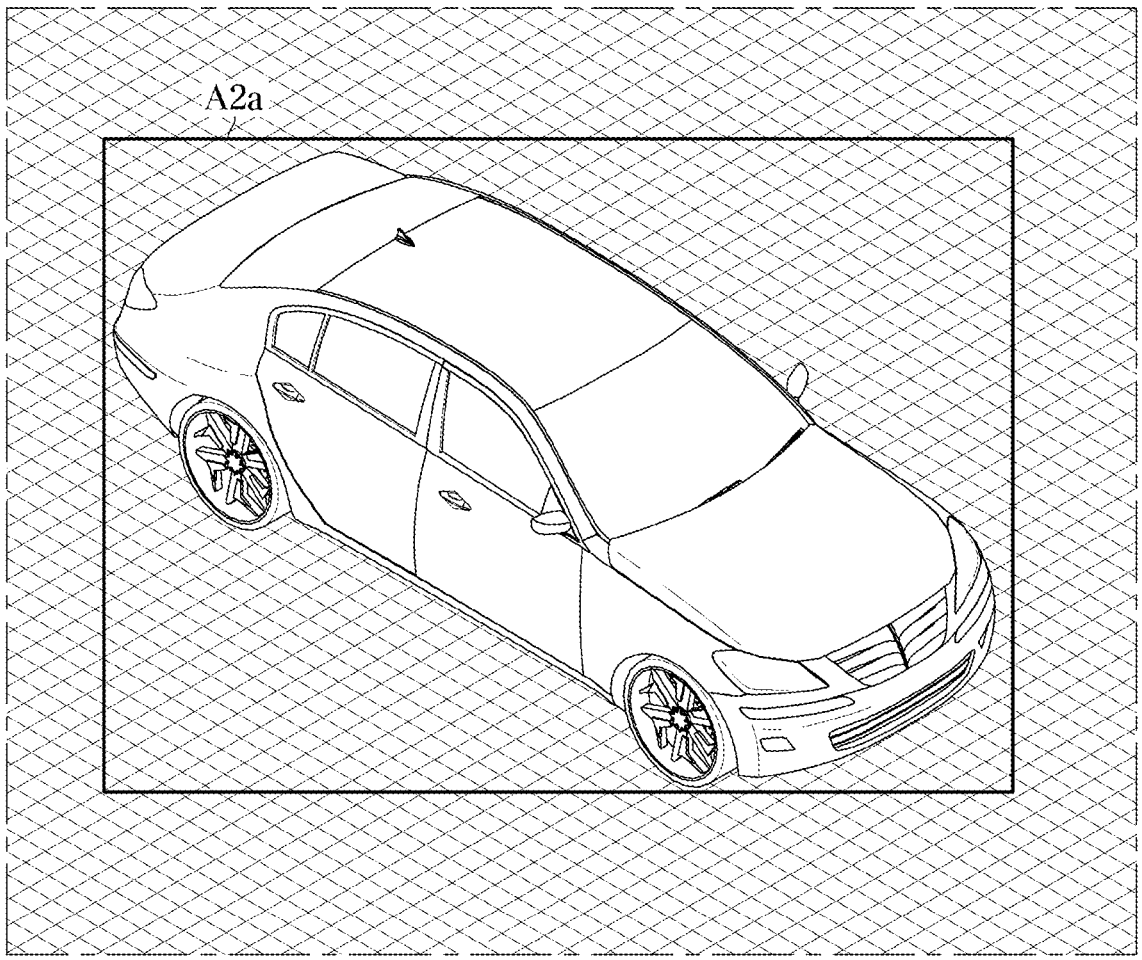
FIGS. 2A, 2B, and 2C are diagrams for explaining an operation of recognizing an image of a surrounding vehicle according to an exemplary embodiment.
Figure 2B:
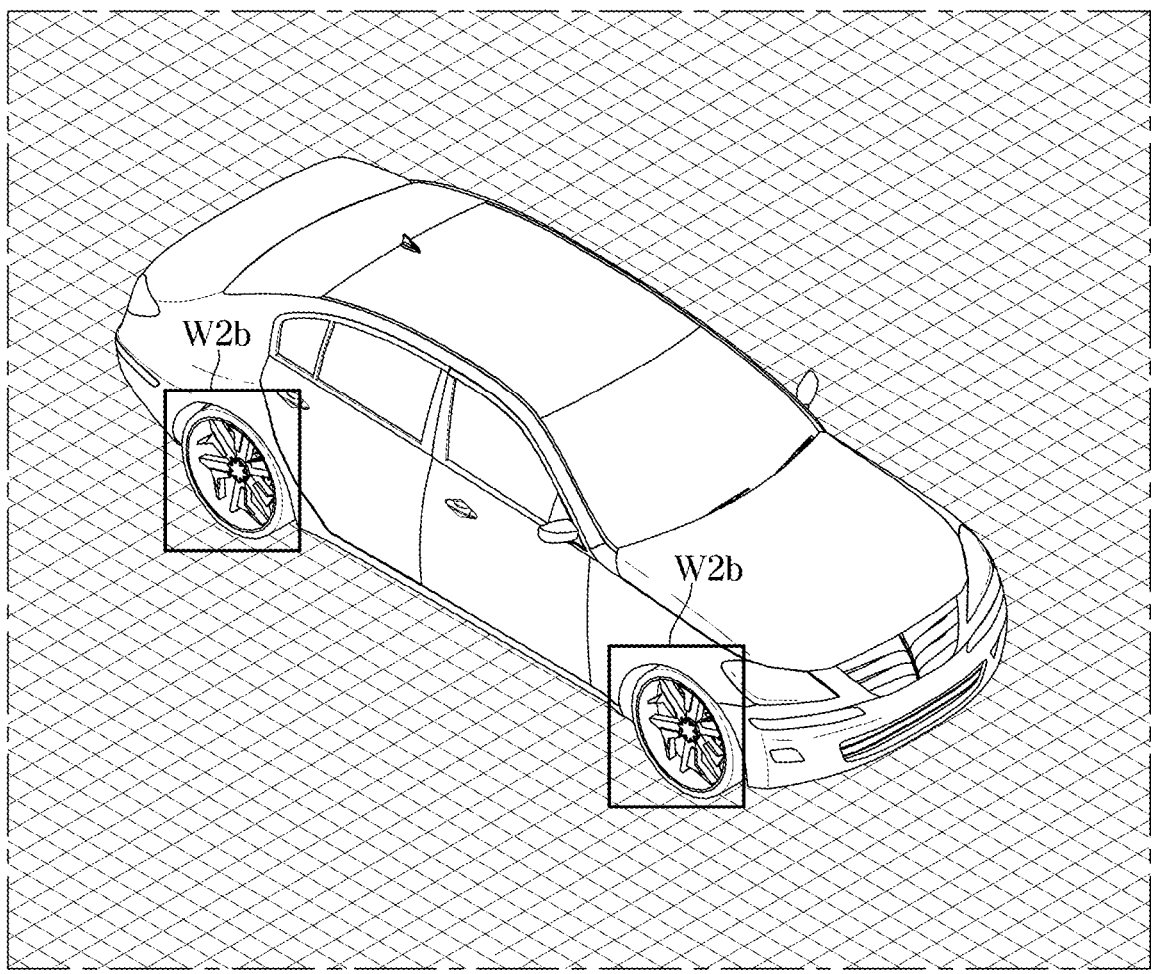
Figure 2C:
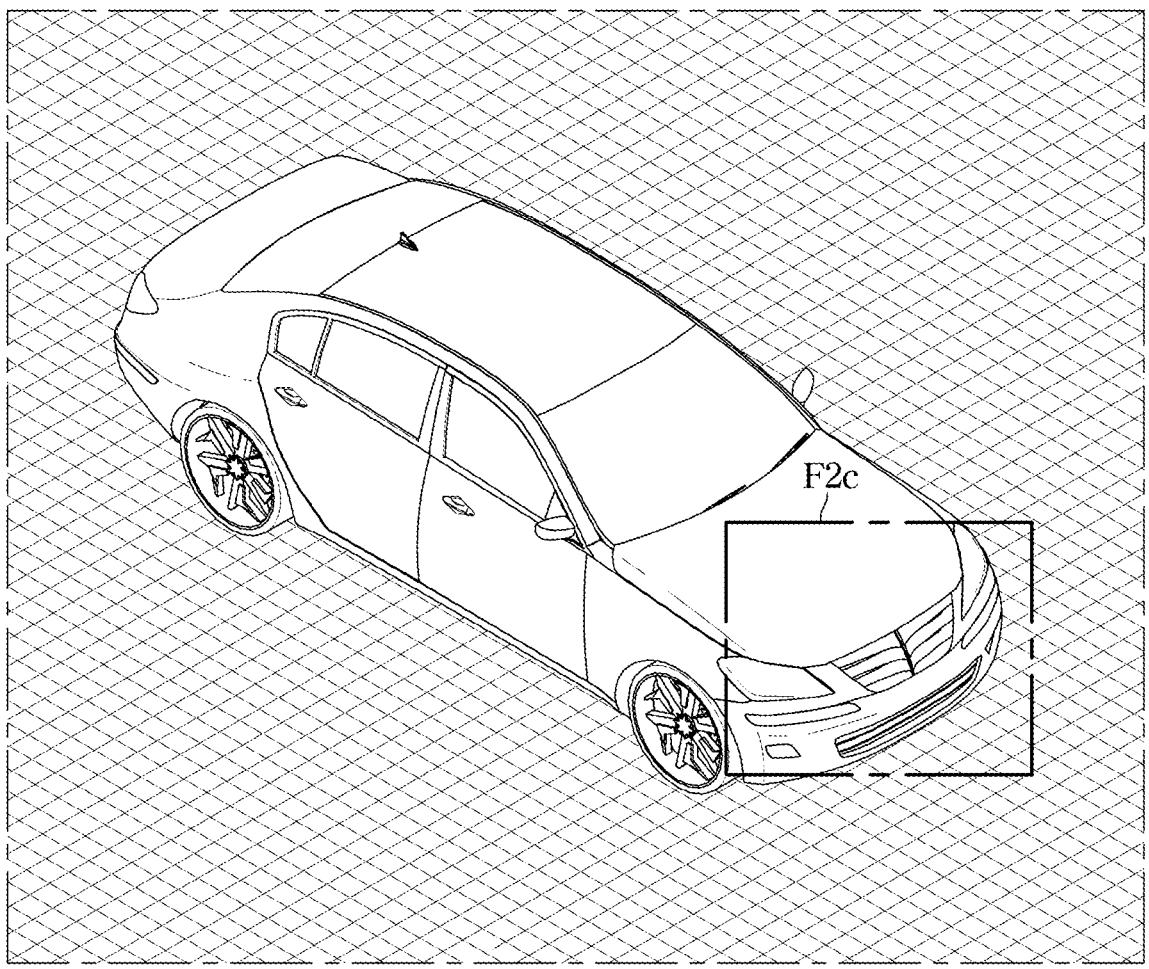

FIGS. 2A, 2B, and 2C are diagrams for explaining an operation of recognizing an image of a nearby vehicle according to an exemplary embodiment.

The controller can detect the vehicle in the image through the camera.

The controller may perform image processing that recognizes objects in units of frames received through the camera.

FIG. 2A illustrates that the camera has acquired the entire image A2a of the surrounding vehicle. The entire image refers to the overall outline of the surrounding vehicle, and the vehicle can derive the entire image area of the surrounding vehicle by forming a bounding box on the entire image of the surrounding vehicle.

FIG. 2B illustrates an operation of obtaining a wheel image of a vehicle and forming a bounding box on the wheel image W2b of the vehicle to derive a wheel image area.

FIG. 2C illustrates that the camera acquires a front-rear image of a nearby vehicle.

In FIG. 2C, an operation of obtaining a front image F2c of the vehicle and forming a bounding box on the front image of the vehicle to derive a front-rear image area is shown. Such an operation can be implemented in the same operation at the rear of the vehicle.

On the other hand, the image recognized in the FIGs is only an exemplary embodiment, and there is no limitation on the form of the recognized image.

Figure 3:
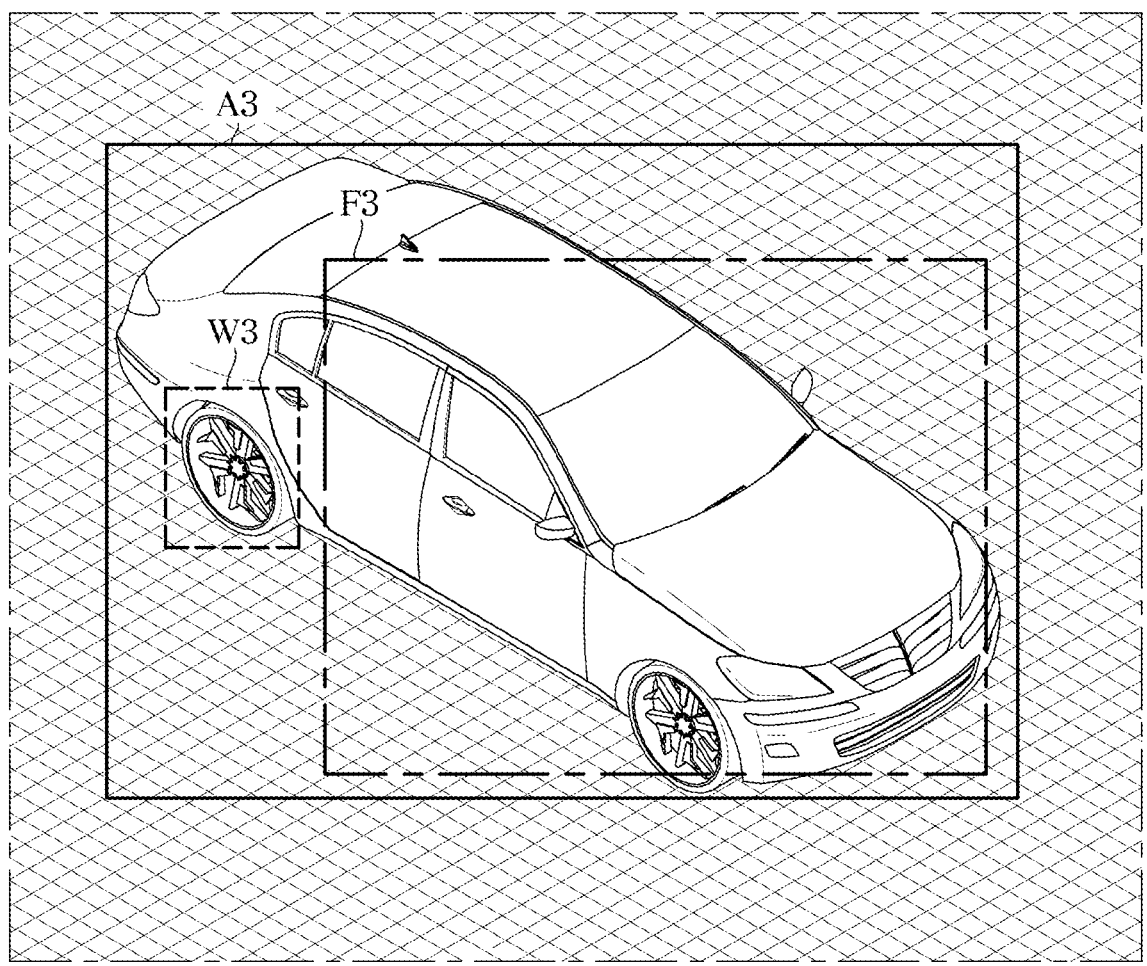
FIG. 3 is a diagram illustrating an operation of grouping an image corresponding to a surrounding vehicle according to an exemplary embodiment.

FIG. 3 is a diagram illustrating an operation of grouping an image corresponding to a surrounding vehicle according to an exemplary embodiment.

Grouping means that the entire image A3 of the surrounding vehicle, the front-rear image F3 of the vehicle, and the wheel image W3 are grouped into one object to determine an image corresponding to the surrounding vehicle.

Specifically, the controller may determine whether the front-rear image area F3 and the wheel image area W3 are included in the image based on the detected entire vehicle image area A3.

When there is a detected object, the controller can check whether the center of the object area is included in the entire image area of the vehicle.

When the center of each image area is within the entire image area of the vehicle, the controller may include it as a grouping element, and when not included, the corresponding object may be determined as an object of another vehicle.

The operation described in FIG. 3 is only an embodiment of the grouping according to the present disclosure, and there is no limitation in grouping the entire vehicle image, the wheel image, and the front-rear image.

Figure 4:
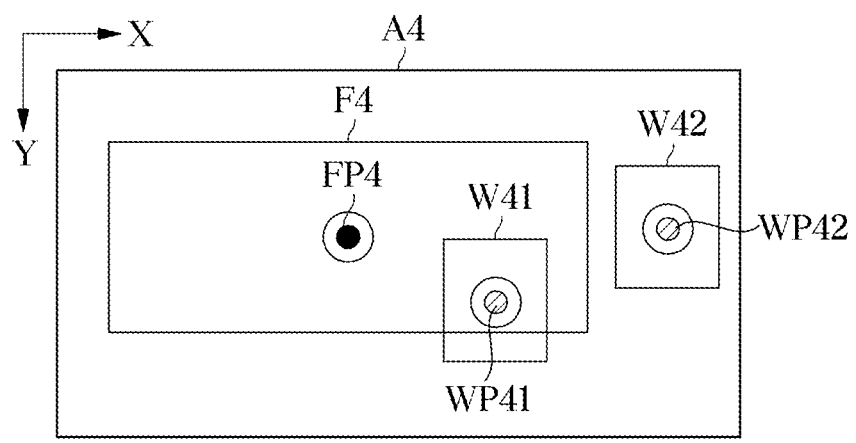
FIGS. 4 to 6 are diagrams for explaining an operation of erroneous detection according to an exemplary embodiment.
Figure 5:
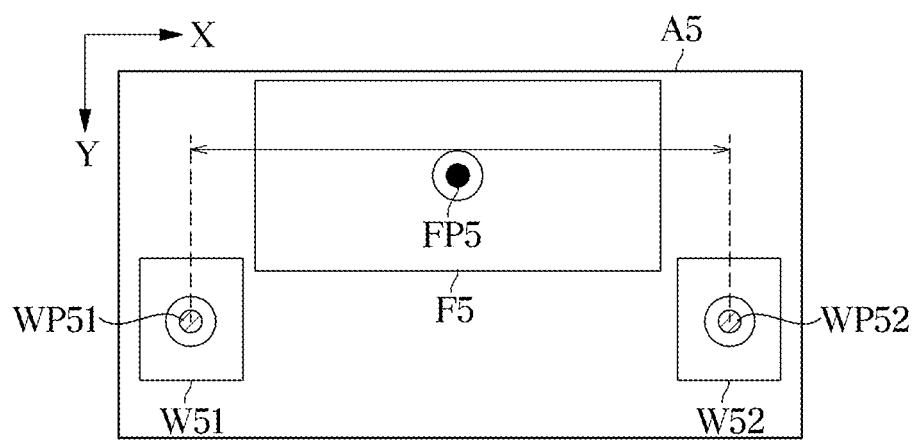
Figure 6:
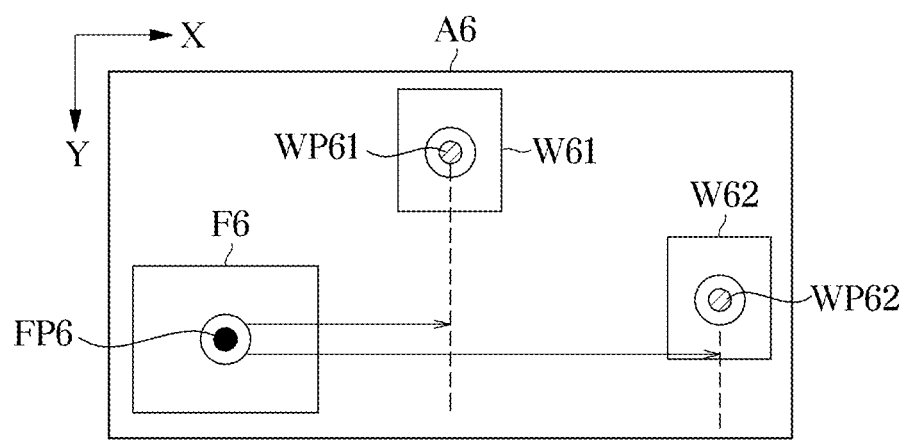

FIGS. 4 to 6 are diagrams for explaining an operation of erroneous detection according to an exemplary embodiment.

Referring to FIG. 4, if the center coordinates of at least two image areas of the wheel image area or the front-rear image area are included in one of the wheel image area or the front-rear image area, the controller determines that it is erroneously detected. can do.

FIG. 4 specifically shows a case where the center coordinates (FP4, WP41, WP42) of each element are included in each other's image area in all the elements (F4, W41, W42) detected in the entire image (A4).

However, when the center coordinate FP4 of the front-rear image area F4 is included in the wheel image areas WP1 and WP2, it may be determined that the object is overlapped and detected, as a false detection.

In FIG. 4, the front-rear image area F4 includes the center coordinate WP41 of the wheel image area W41. In this case, the controller may determine that the corresponding objects are erroneously detected.

Referring to FIG. 5, the controller acquires wheel images of a plurality of surrounding vehicles and front-rear images of surrounding vehicles, and determines as erroneous detection when the front-rear image area of the surrounding vehicle is provided between the coordinates of the wheel image area of the plurality of surrounding vehicles.

FIG. 5 illustrates a case where one center coordinates WP51 and WP52 of the wheel images W51 and W52 are large and one is small based on the center coordinate FP5 of the front-rear image.

Considering the shape of the vehicle, the surrounding vehicle recognized by the camera cannot have a front and rear image F5 between the vehicle wheel images W51 and W52 within the overall image A5.

In order for the front and rear images of the vehicle (FP5) to exist between the wheel images (W51, W52) in the image, both sides of the vehicle must be seen at the same time or the door between the wheels is recognized as a front-rear image, the controller determines it as an erroneous detection.

Referring to FIG. 6, the controller acquires a plurality of wheel images of the surrounding vehicles and a front-rear image of the surrounding vehicles, and compares coordinate information of the wheel image regions of the plurality of surrounding vehicles to determine whether or not an error is detected.

FIG. 6 shows a case in which the center y coordinate of the wheel image W61, which is close to the center x coordinate of the wheel images based on the center x coordinate of the front-rear image F6, is smaller than the center y coordinate of the wheel image W62 that is not.

When considering the shape of the vehicle, the vehicle recognized in the camera image is the y of the nearest wheel image (W61) among the x coordinates of the wheel images based on the x coordinate of the front and rear image (F6) within the entire image (A6) of the vehicle. The coordinates cannot be smaller than the y coordinates of other wheel images. Therefore, in this case, the controller can determine that the vehicle image has been erroneously detected.

The erroneous detection operation described in FIGS. 4 to 6 is for explaining an exemplary embodiment of the present disclosure, and there is no limitation on an operation in which the vehicle determines whether an image of a surrounding vehicle is erroneously detected.

Figure 7:
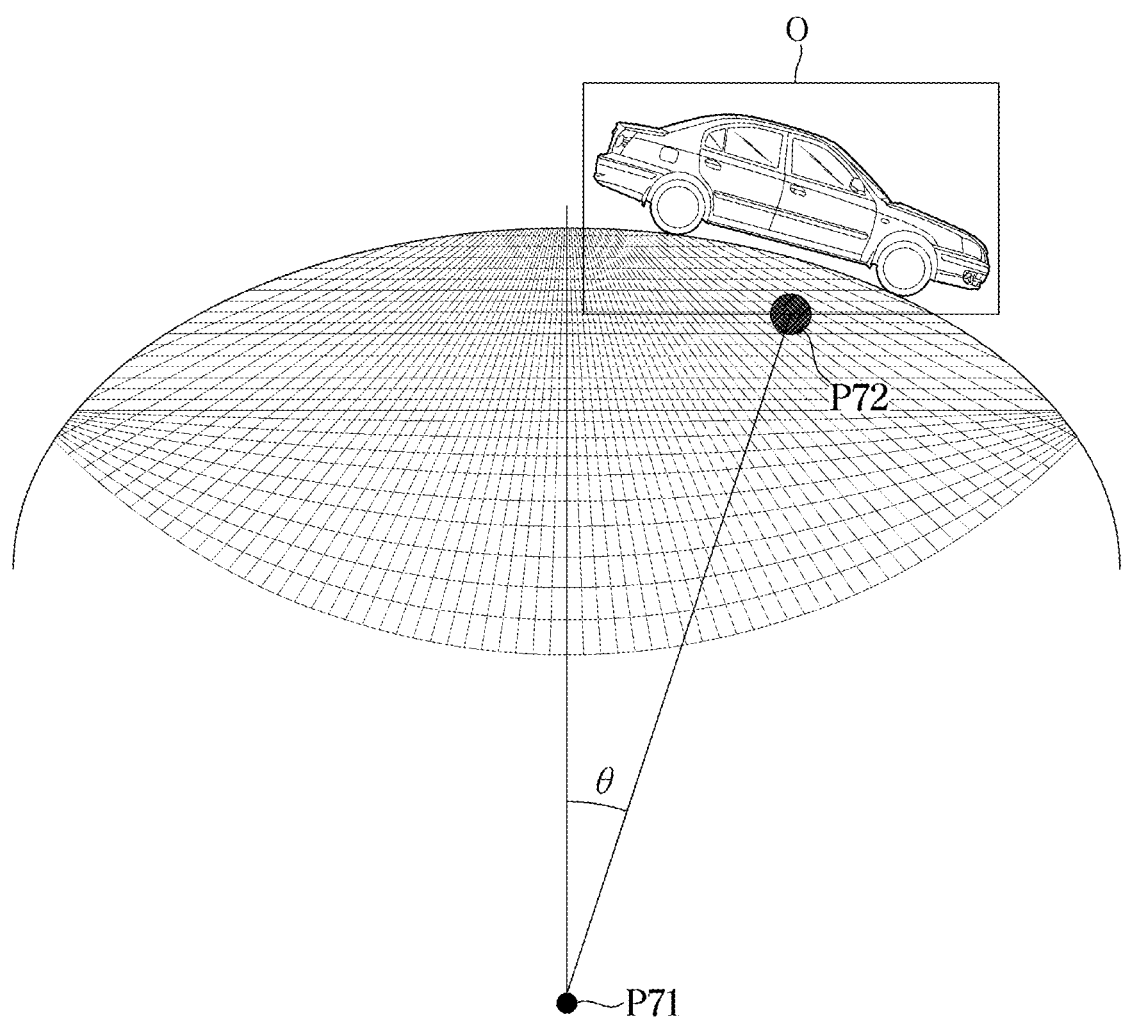
FIG. 7 is a diagram for describing an operation of determining a direction of a nearby vehicle based on a vehicle according to an exemplary embodiment.

FIG. 7 is a diagram for explaining an operation of determining a direction of a nearby vehicle based on a vehicle as a reference P71 according to an exemplary embodiment.

The controller may determine the direction of the surrounding vehicle based on the closest point between the vehicle and the surrounding vehicle determined based on an operation to be described later.

That is, in FIG. 7, it is possible to determine the location P71 of the vehicle and derive direction information between the vehicle and the surrounding vehicles in consideration of the nearest point P72 of the surrounding vehicle O and the location of the vehicle.

The controller may determine the direction to the surrounding vehicle for which it is determined whether or not an erroneous detection has occurred.

According to an embodiment, the camera may be provided as a Surround View Monitor (SVM) camera. The controller can determine the location of the surrounding vehicle O in the image received from the camera.

The controller may determine the direction of the vehicle based on the front-rear image and the wheel image of the surrounding vehicle seen from the vehicle for each detection type.

Referring to FIG. 7, when an image view is obtained from a camera, and when it is determined that a vehicle of the surrounding vehicle O is detected as a result of pairing, coordinates may be derived at the lower center P72 of the surrounding vehicle image area. The controller may determine direction information between the vehicle and surrounding vehicles based on the corresponding coordinates.

In addition, the controller may determine the direction of the surrounding vehicle based on the vehicle based on the detection type determined based on the entire image of the surrounding vehicle, the wheel image of the surrounding vehicle, and the front-rear image of the surrounding vehicle.

When the image is acquired, the direction of the vehicle can be estimated through the grouping result elements. By synthesizing the vehicle's position angle θ and the direction estimation result for each detection type, the position and direction of another vehicle compared to the vehicle can be determined.

The operation of determining the direction described in FIG. 7 is only an embodiment of the present disclosure, and there is no limitation on the operation of determining direction information with respect to the surrounding vehicle based on the vehicle.

FIGS. 8 to 13 are diagrams for describing an operation of determining a distance between a vehicle and a surrounding vehicle according to an exemplary embodiment.

Figure 8:
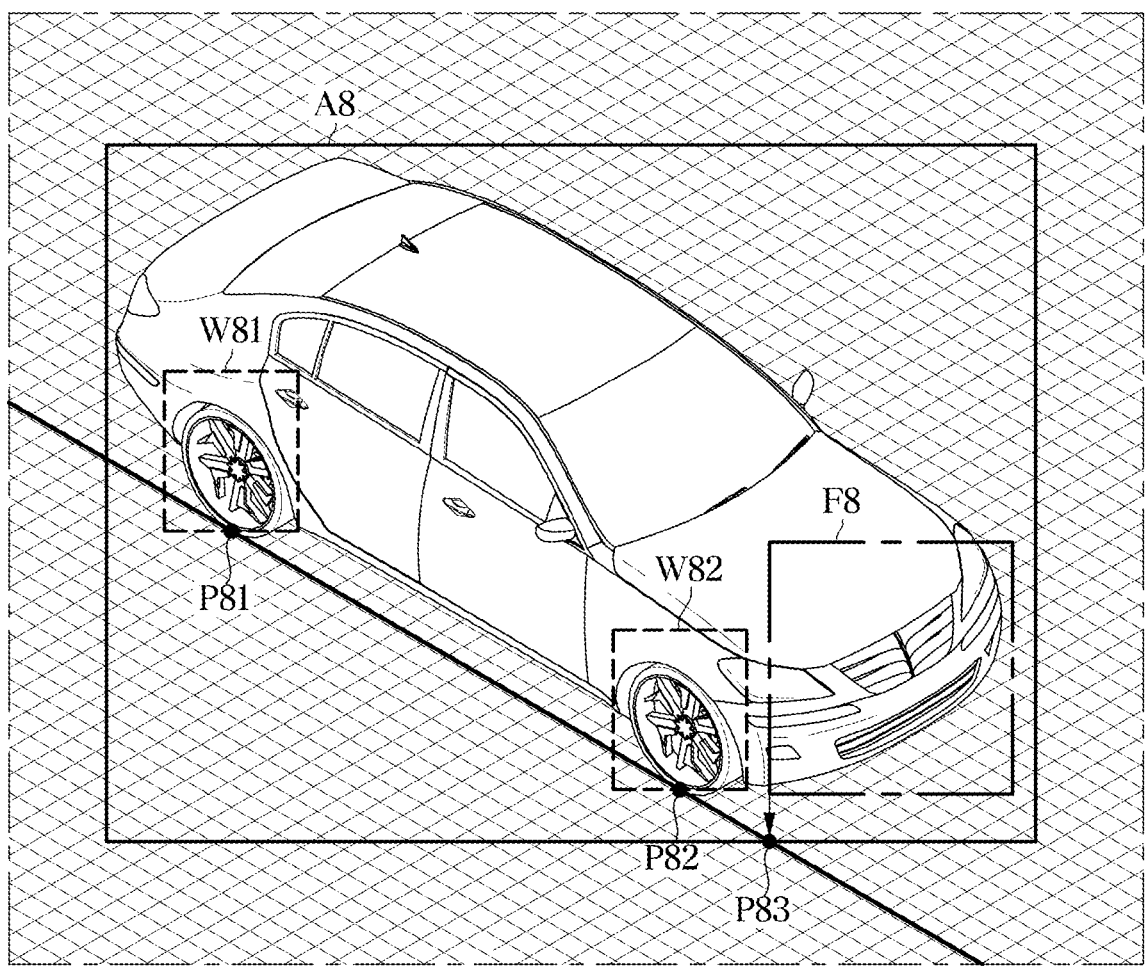
FIGS. 8 to 13 are diagrams for describing an operation of determining a distance between a vehicle and a surrounding vehicle according to an exemplary embodiment.

Referring to FIG. 8, when a plurality of wheel images P81 and P82 of the surrounding vehicles are detected, the controller may determine distance information from the vehicle to surrounding vehicles based on the intersection of the extension line of the lower center point (P81, P82) of each of the wheel image areas P81 and P82 of the plurality of surrounding vehicles and the vertical extension line of the front-rear image area of the surrounding vehicle close to the wheel image area of the plurality of surrounding vehicles (P83).

Specifically, the controller may determine the point P83 as the location of another vehicle, that is, the nearest point, and determine distance information between the vehicle and the surrounding vehicle.

Figure 9:
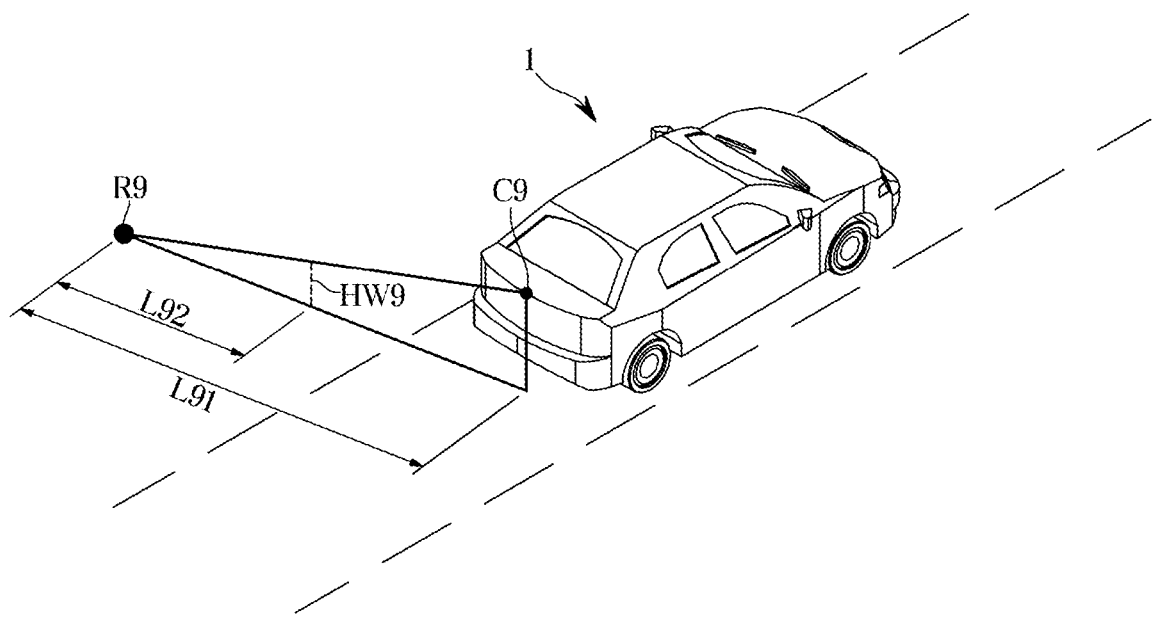

Referring to FIG. 9, when a wheel image area of one of the surrounding vehicles is detected, the controller may determine a first distance L91 from R9 corresponding to the height coordinate C9 of the camera and a second distance L92 of the wheel image area hw9 of the surrounding vehicle.

The controller may determine the height coordinate of the wheel image area of the surrounding vehicle based on a ratio of the first distance L91 and the second distance L92.

The 2D image coordinates of the upper/lower center of the detected wheel image can be converted into 3D spatial coordinates based on the ground. When the controller converts 2D coordinates on the image to 3D in real space, it cannot estimate the height value.

The controller can create spatial coordinates based on the ground.

The controller may return the 3D coordinate of the point R9 where the line segment connecting the camera C9 and the wheel image area hw9 on the image meets the ground because the upper center coordinate height value of the wheel image area hw9 is ignored.

Since the corresponding coordinate is a coordinate conversion without considering the height value, the upper coordinate of the wheel image hw9 below may be converted to a distant point.

Subsequently, the controller can estimate the height of the wheel image in a proportional manner using the lower center of the wheel image hw9 and the 3D space coordinate length value of R9 and the mounting height value (c) of the camera.

Figure 10:
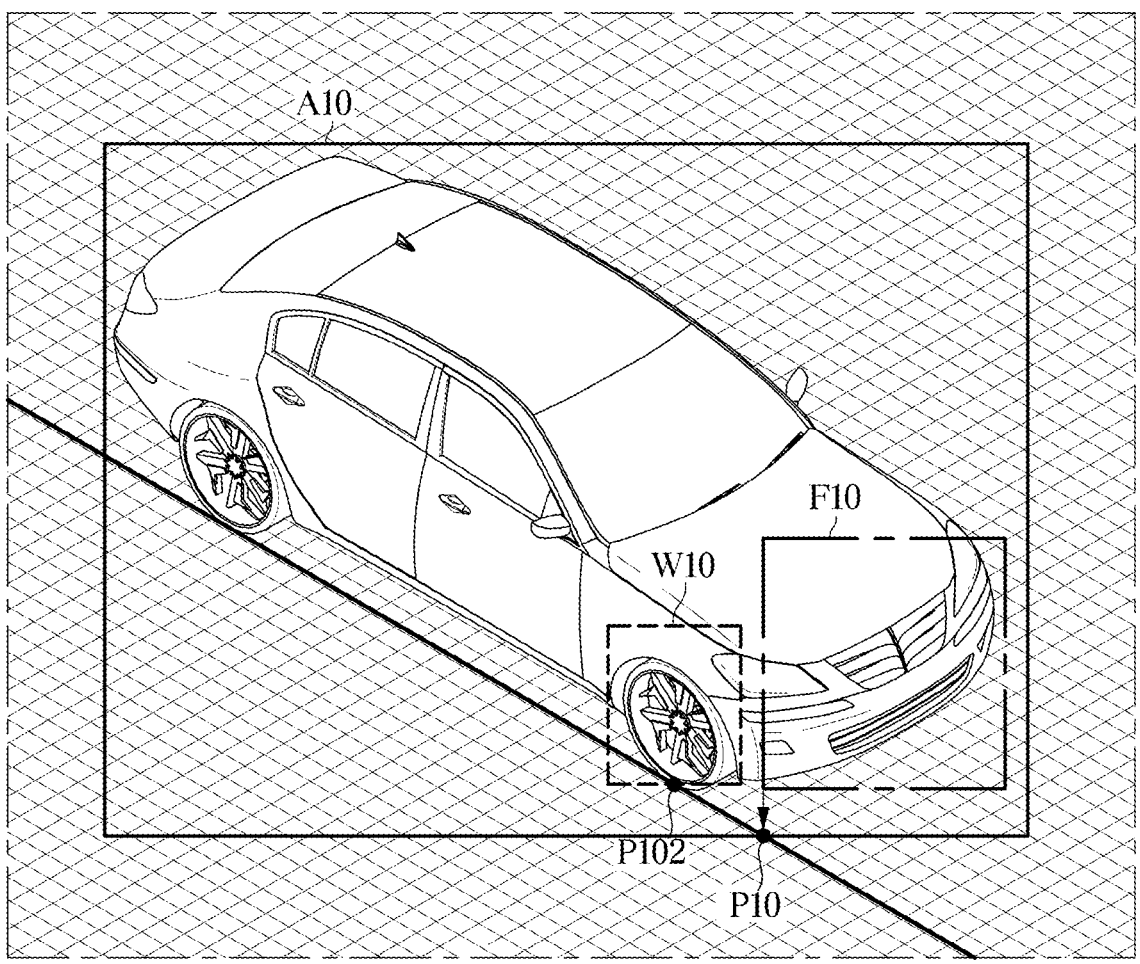

Referring to FIGS. 9 and 10 together, the controller generates a vertical extension line of the front-rear image area F10 of the surrounding vehicle based on the height coordinates of the wheel image area W10 of the surrounding vehicle, and determines the intersection of the vertical extension line and the ground P10 as the nearest point, and determine distance information from the vehicle to the surrounding vehicle based on this.

Figure 11:
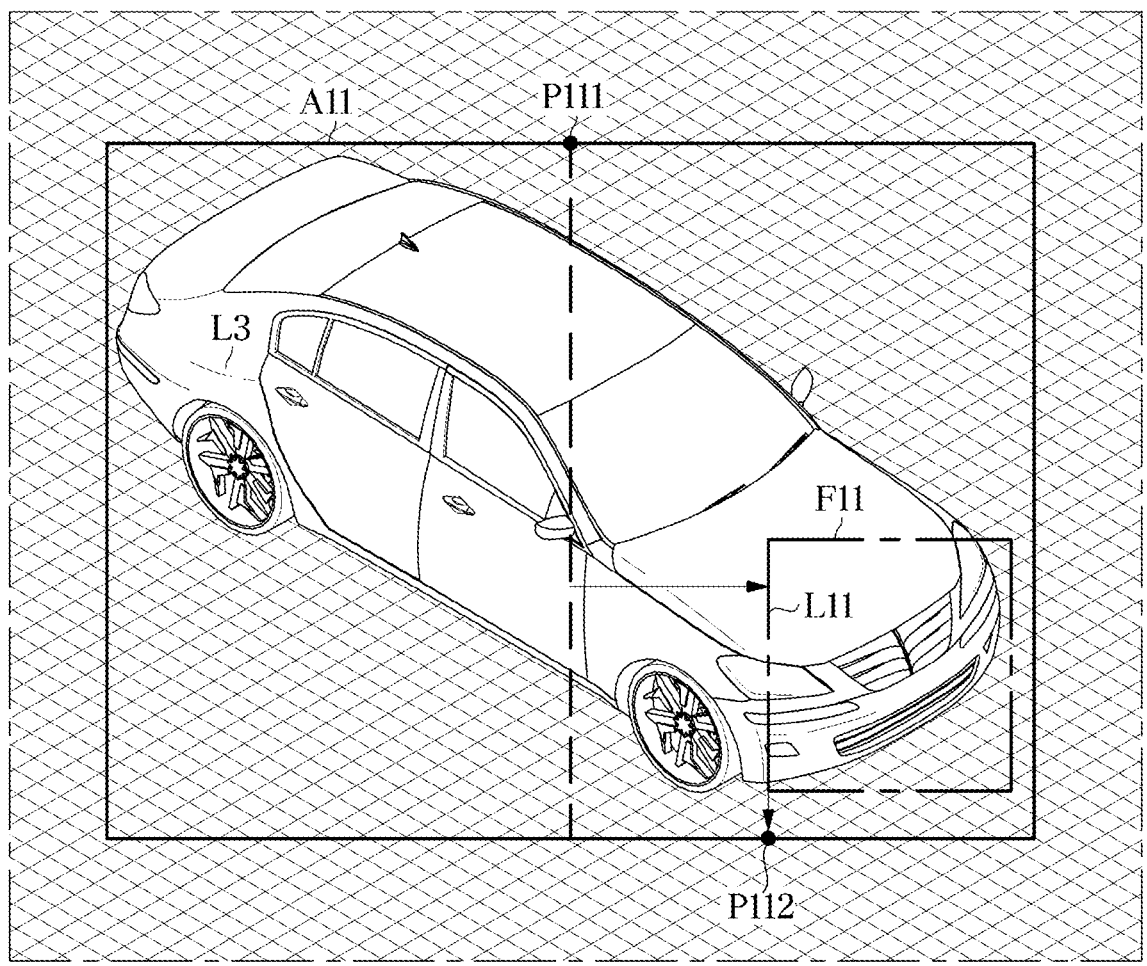

Referring to FIG. 11, the controller may detect only the entire image of the surrounding vehicle and the front-rear image of the surrounding vehicle.

The controller may determine an intersection point P112 between the ground and the vertical extension line L11 of the front-rear image area F 11 of the surrounding vehicle near the center line P112 P111 of the entire image area of the surrounding vehicle as the nearest point.

The controller may determine distance information from the vehicle to the surrounding vehicle based on the nearest point.

Figure 12:
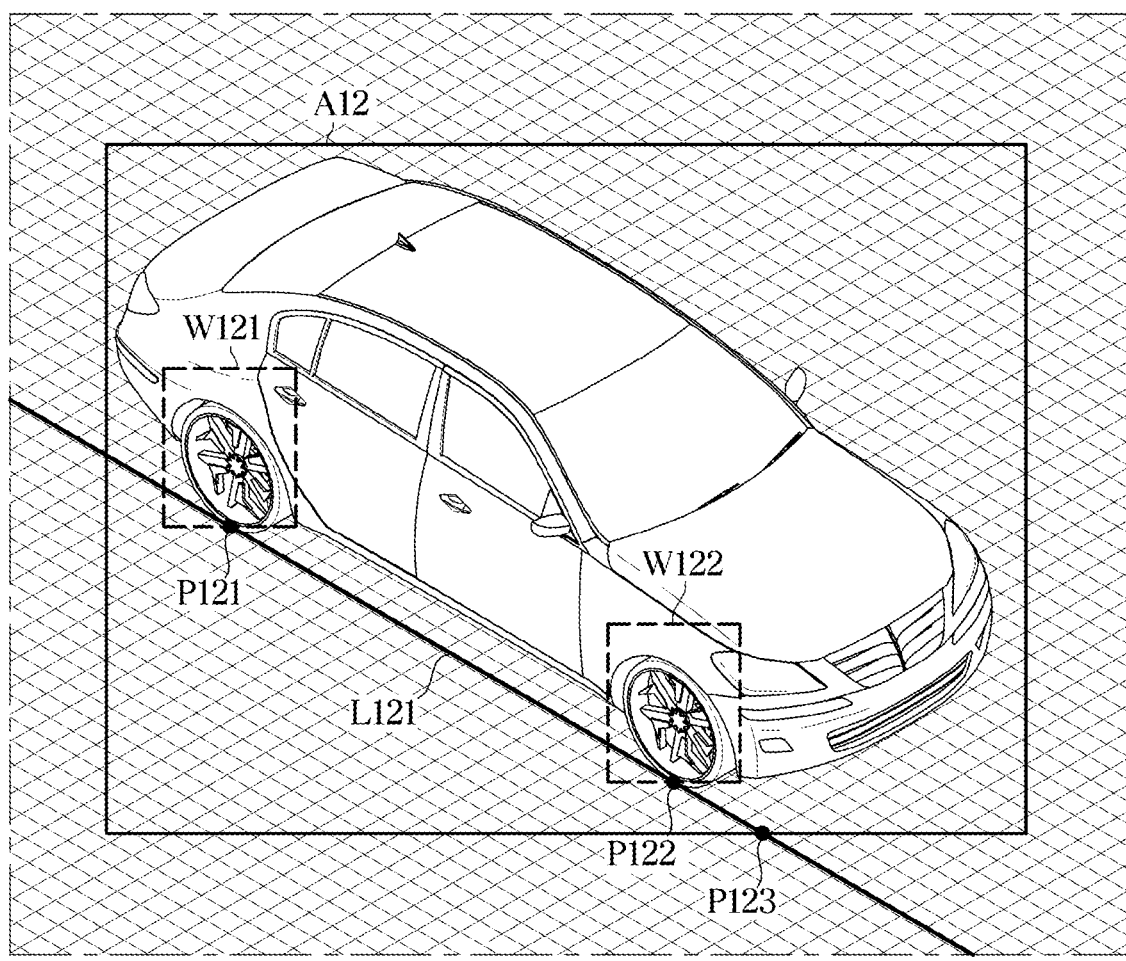

Referring to FIG. 12, when only the entire image Al2 of the surrounding vehicle and the wheel images W121 and W122 of a plurality of surrounding vehicles are detected, the controller determines the closest point of the intersection (P123) of the extension line of the lower center points P121 and P122 of the wheel image areas of the plurality of surrounding vehicles and the lower line of the entire image area Al2 of the surrounding vehicles, and based on this, the controller may determine distance information from the vehicle to the surrounding vehicle.

Figure 13:
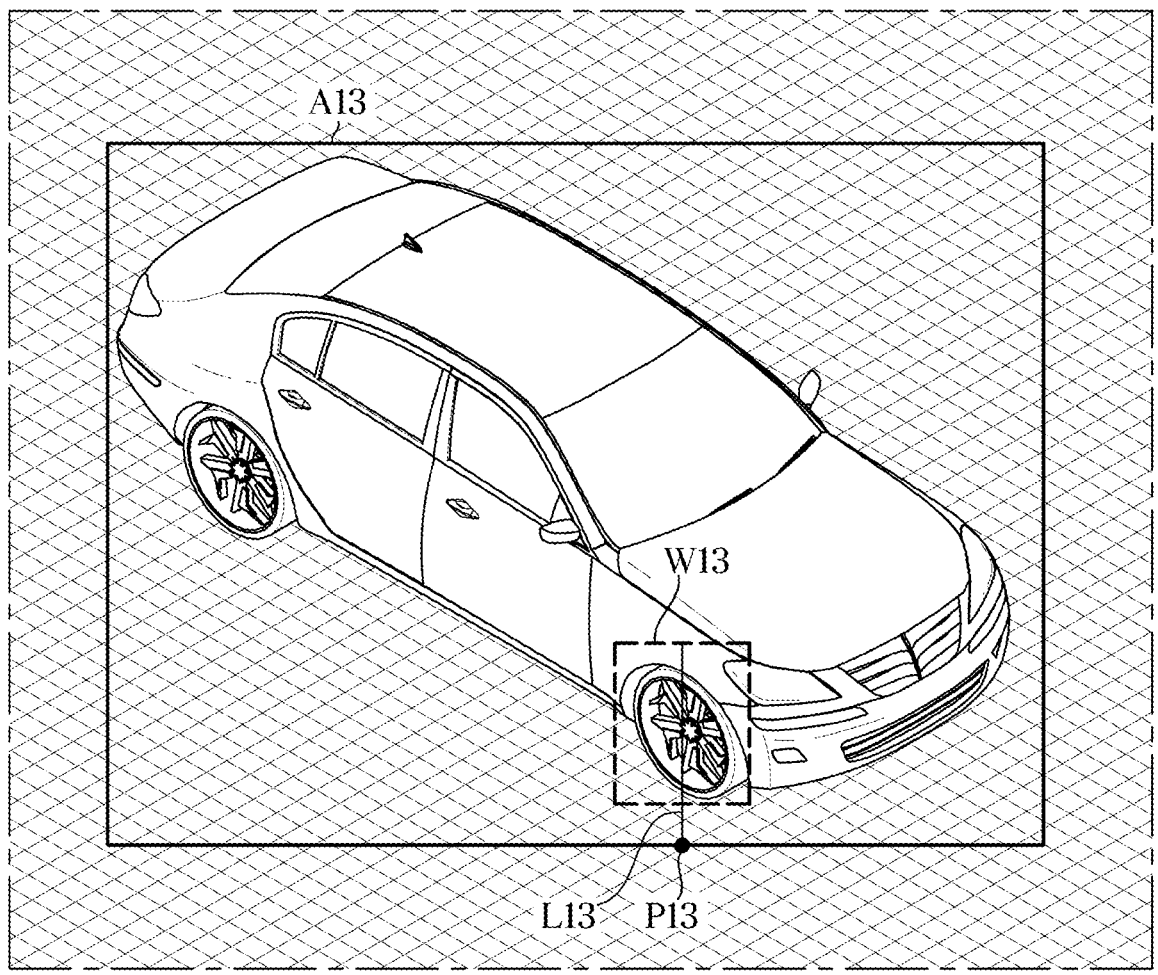

Referring to FIG. 13, when only the entire image of the surrounding vehicle and only one wheel image of the surrounding vehicle are detected, the controller determines the intersection point (P13) of the extension line (L13) of the center line of one wheel image area (W13) and the lower line of the entire image area of the surrounding vehicle as the nearest point, and based on this, the distance information from the vehicle to the surrounding vehicle is determined.

The operations described in FIGS. 8 to 13 are only an embodiment of deriving the distance information of the present disclosure, and there is no limitation on the operation of deriving the nearest point of the present disclosure.

Figure 14:
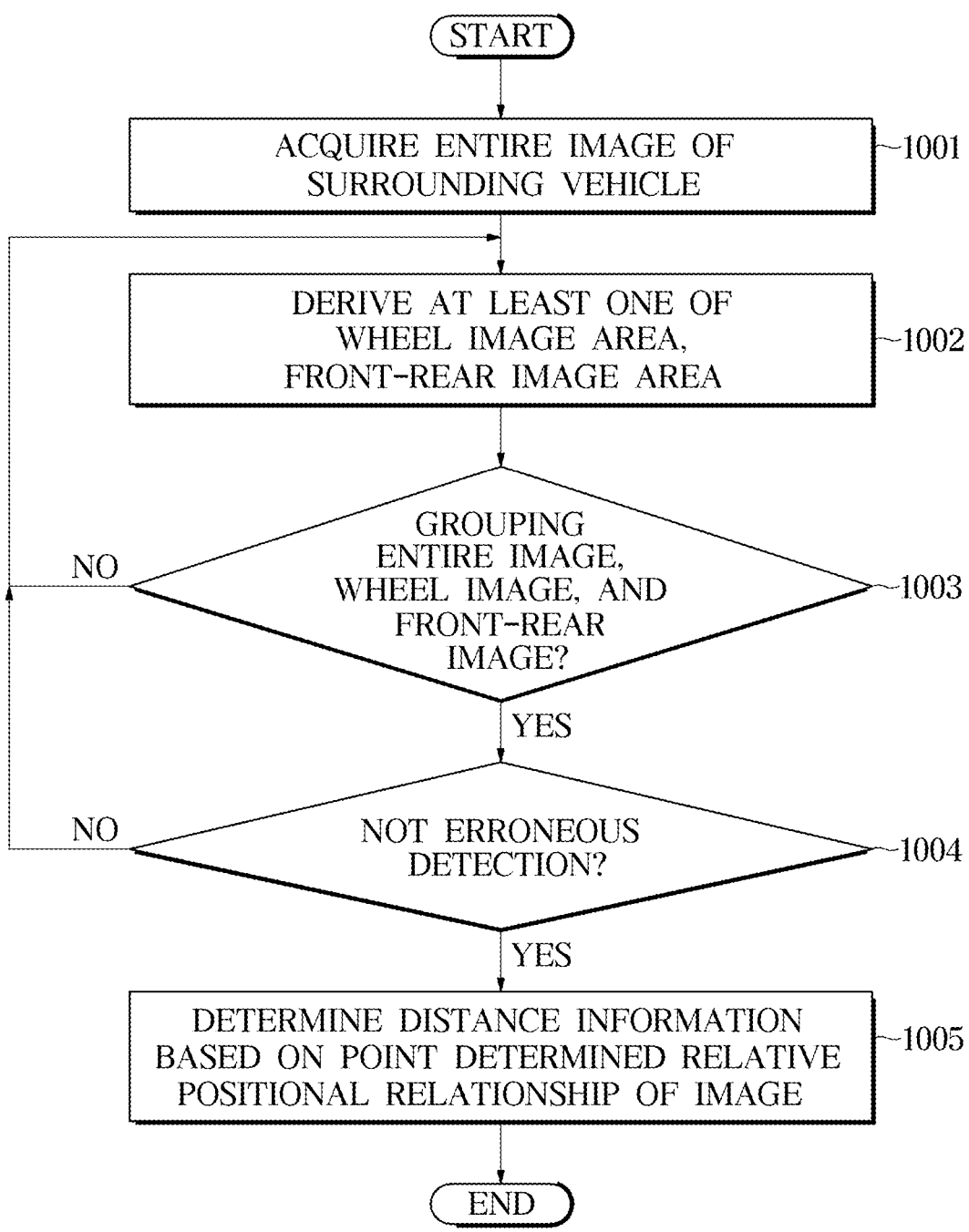
FIG. 14 is a flowchart according to an embodiment.

FIG. 14 is a flow chart according to an embodiment.

The vehicle may acquire an entire image of surrounding vehicles through the camera (1001).

In addition, the controller may derive at least one of the wheel image area and the front-rear image area (1002).

The controller can group full images, wheel images, and front-rear images (1003).

The controller can determine whether or not the image has been erroneously detected. If it is not erroneous detection, distance information may be determined based on a point determined by the relative positional relationship of the image (1004, 1005).

On the other hand, the disclosed exemplary embodiments may be implemented in a form of a recording medium for storing instructions executable by a computer. Instructions may be stored in a form of program code and, when executed by a processor, may generate a program module to perform the operations of the disclosed exemplary embodiments. The recording medium may be implemented as a computer-readable recording medium.

The computer-readable recording medium includes all kinds of recording media in which instructions which may be decoded by a computer. For example, there may be read only memory (ROM), random access memory (RAM), a magnetic tape, a magnetic disk, a flash memory, an optical data storage device, and the like.

As described above, the disclosed exemplary embodiments have been described with reference to the accompanying drawings. Although example embodiments of the present disclosure have been shown and described, it would be appreciated by those skilled in the art that changes may be made to these embodiments without departing from the principles and spirit of the present disclosure, the scope of which is defined in the claims and their equivalents.

The vehicle and the controlling method according to an exemplary embodiment may efficiently and accurately calculate the distance and direction of the vehicle and the surrounding vehicle by using the positional relationship of the entire image of the surrounding vehicle, the wheel image and the front-rear image.

What is claimed is:

1. An apparatus for acquiring surrounding information of a vehicle, comprising:
   a camera configured to acquire an entire image of at least one surrounding vehicle; and
   a controller configured to:
   derive at least one of coordinates of a wheel image area or coordinates of a front-rear image area, the wheel image area and the front-rear image area being included in an entire image area, and
   determine distance information from the vehicle to the at least one surrounding vehicle based on a relative positional relationship between the entire image area, and the at least one of the wheel image area coordinates or the front-rear image area coordinates,
   wherein the controller is configured to determine the entire image as being erroneously detected when center coordinates of at least two image areas of the wheel image area or the front-rear image area are included in one of the wheel image area or the front-rear image area.

2. The apparatus according to claim 1, wherein the controller is configured to group at least one of the wheel image area or the front-rear image area into an image corresponding to the at least one surrounding vehicle.

3. The apparatus according to claim 1, wherein the controller is configured to acquire a plurality of wheel images and a plurality of front-rear images and determine that the entire image has been erroneously detected when the front-rear image area is located between coordinates of a plurality of wheel image areas.

4. The apparatus according to claim 1, wherein the controller is configured to acquire a plurality of wheel images and a plurality of front-rear images, and determine whether or not erroneous detection has occurred by comparing coordinate information of the plurality of wheel images.

5. The apparatus according to claim 1, wherein, when a plurality of the wheel images are detected, the controller is configured to determine the distance information from the vehicle to the at least one surrounding vehicle based on an intersection between a lower center point extension line of each of a plurality of wheel image areas and a vertical extension line of the front-rear image area adjacent to the plurality of wheel image areas.

6. The apparatus according to claim 1, wherein the controller is configured to:
   determine a first distance corresponding to a height coordinate of the camera, and a second distance of the wheel image area,
   determine height coordinates of the wheel image area based on a ratio of the first distance and the second distance,
   generate a vertical extension line of the front-rear image area based on the height coordinates of the wheel image area, and
   determine the distance information from the vehicle to the at least one surrounding vehicle based on an intersection of a vertical line and a ground.

7. The apparatus according to claim 1, wherein the controller is configured to determine the distance information from the vehicle to the at least one surrounding vehicle based on an intersection of a vertical extension line of the front-rear image area adjacent to a center line of the entire image area and a ground when only the entire image area and the front-rear image area are detected.

8. The apparatus according to claim 1, wherein, when only the entire image and a plurality of wheel images are detected, the controller is configured to determine the distance information from the vehicle to the at least one surrounding vehicle based on an intersection of an extension line of a lower center point of a plurality of wheel image areas and a lower line of the entire image area.

9. The apparatus according to claim 1, wherein, when only the entire image and one wheel image are detected, the controller is configured to determine the distance information from the vehicle to the at least one surrounding vehicle based on an intersection of an extension line of a center line of one wheel image area and a lower line of the entire image area.

10. The apparatus according to claim 1, wherein the controller is configured to determine a direction of the at least one surrounding vehicle based on the vehicle and the entire image area, the wheel image area, and the front-rear image area.

11. A controlling method for acquiring surrounding information of a vehicle, comprising:
    acquiring, by a camera, an entire image of at least one surrounding vehicle;
    deriving, by a controller, at least one of coordinates of a wheel image area or coordinates of a front-rear image area included in an entire image area,
    determining, by the controller, distance information from the vehicle to the at least one surrounding vehicle based on a relative positional relationship between the entire image area and the at least one of the wheel image area coordinates or the front-rear image area coordinates, and
    determining the entire image as being erroneously detected when center coordinates of at least two image areas of the wheel image area or the front-rear image area are included in one of the wheel image area or the front-rear image area.

12. The method according to claim 11, further comprising grouping at least one of the wheel image area or the front-rear image area included in the entire image area into an image corresponding to the at least one surrounding vehicle.

13. The method according to claim 11, further comprising:
acquiring a plurality of wheel images and a plurality of front-rear images; and
determining that the entire image has been erroneously detected when the front-rear image area is located between a plurality of wheel image area coordinates.

14. The method according to claim 11, further comprising:
acquiring a plurality of wheel images and a plurality of front-rear images; and
determining whether or not erroneous detection of the entire image has occurred by comparing coordinate information of the plurality of wheel images.

15. The method according to claim 11, wherein the determining the distance information from the vehicle to the at least one surrounding vehicle includes, when a plurality of wheel images are detected, determining the distance information from the vehicle to the at least one surrounding vehicle based on an intersection between a lower center point extension line of each of a plurality of wheel image areas and a vertical extension line of the front-rear image area adjacent to the plurality of wheel image areas.

16. The method according to claim 11, wherein the determining the distance information from the vehicle to the at least one surrounding vehicle includes:
determining a first distance corresponding to a height coordinate of the camera, and a second distance of the wheel image area;
determining height coordinates of the wheel image area based on a ratio of the first distance and the second distance;
generating a vertical extension line of the front-rear image area based on the height coordinates of the wheel image area; and
determining the distance information from the vehicle to the at least one surrounding vehicle based on an intersection of the vertical extension line and a ground.

17. The method according to claim 11, wherein the determining the distance information from the vehicle to the at least one surrounding vehicle includes, when only the entire image and the front-rear image are detected, determining the distance information from the vehicle to the at least one surrounding vehicle based on an intersection of a vertical extension line of the front-rear image area adjacent to a center line of the entire image area and a ground.

18. The method according to claim 11, wherein the determining the distance information from the vehicle to the at least one surrounding vehicle includes, when only the entire image and a plurality of wheel images are detected, determining the distance information from the vehicle to the at least one surrounding vehicle based on an intersection of an extension line of a lower center point of a plurality of wheel image areas and a lower line of the entire image area.

* * * * *